United States Patent [19]

Koyama et al.

[11] 4,131,843
[45] Dec. 26, 1978

[54] HIGH TENSION VOLTAGE SOURCE

[75] Inventors: Masateru Koyama, Suita; Kazuo Arakawa, Toyonaka, both of Japan

[73] Assignee: Matsushita Electric Industrial Co., Ltd., Kadoma, Japan

[21] Appl. No.: 746,749

[22] Filed: Dec. 2, 1976

[30] Foreign Application Priority Data

Dec. 9, 1975 [JP] Japan .............................. 50-147219
Dec. 18, 1975 [JP] Japan .............................. 50-171768

[51] Int. Cl.² ...................... G05F 1/58; H02P 13/24
[52] U.S. Cl. ...................................... 323/9; 323/17; 323/19; 361/18; 363/21
[58] Field of Search .................. 363/18, 19, 20, 21; 323/9, 17, DIG. 1, 4, 22 T, 22 Z; 307/270; 361/18

[56] References Cited

U.S. PATENT DOCUMENTS

| 3,093,790 | 6/1963 | Ehret | 323/DIG. 1 |
| 3,435,320 | 3/1969 | Lee et al. | 363/19 |
| 3,820,007 | 6/1974 | Schilling et al. | 323/22 Z |
| 3,889,173 | 6/1975 | Klusmann et al. | 323/17 |
| 4,005,351 | 1/1977 | Blum | 363/21 |

FOREIGN PATENT DOCUMENTS 2033801  1/1972  Fed. Rep. of Germany ........ 323/22 Z Primary Examiner—Gerald Goldberg
Attorney, Agent, or Firm—Cushman, Darby & Cushman

[57] ABSTRACT

This invention relates to the high tension voltage source using a blocking oscillation circuit, wherein a switching transistor is cut off at a certain preset current value through a primary winding of a step-up transformer, thereby producing an output of almost constant voltage by use of this simple circuit, while reducing power consumption. This invention is applicable as a D.C. high tension voltage source for electrostatic dust collectors, namely cottrells.

8 Claims, 5 Drawing Figures

HIGH TENSION VOLTAGE SOURCE

BACKGROUND OF THE INVENTION

The present invention relates to a high tension voltage source using a blocking oscillation circuit, wherein the output voltage is stabilized against the variations of the line voltage and the ambient temperature, and also the power consumption is reduced so that the heating of elements used therein is suppressed. The result is a stable and compact apparatus.

In general, high tension voltage source using a blocking oscillation circuit, a pulse transformer, and a rectification means have, as is well known, an advantage of compactness in size and light weight as for the purpose of low current capacity use, and therefore it has been widely used for xerography, cathode-ray tube applied apparatuses, and small-size electrostatic dust collectors, i.e., cottrells, etc.

For these purposes, those circuits having constructions as shown in FIG. 1, illustrating a self-exciting type, have generally been used. However, in such the construction, the output voltage changes largely due to fluctuations of the line voltage. Also, because the transistor used as a switching element in the circuit has a temperature dependent characteristic, the output voltage changes due to fluctuations of the ambient temperature, too. Describing further the prior art as set out in FIG. 1, the collector of a transistor 1 is connected to one terminal of an A.C. line source through a primary winding 3 of a step-up transformer 2 and power source rectifier diode 4. The other terminal of the A.C. line source is connected to the emitter of said transistor. The base of said transistor 1 is connected through feedback winding 5 to the series connection point of resistors 6 and 7 which supply a bias voltage through feedback winding 5 and the feedback winding 5 is wound so that positive feedback takes place. Hereupon, 8 is a smoothing capacitor, 9 is a damper diode, 10 is a secondary winding of the transformer 2, 11 is a high voltage rectifier diode, and 12 is a high voltage smoothing capacitor. In most cases, stray capacity of a connected load serves as the high voltage smoothing capacitor 12, or in some case the smoothing capacitor 12 is omitted according to the purposes. Also, $A_1$ and $A_2$ are terminals to be connected to the A.C. line source and $B_1$ and $B_2$ are high tension output terminals.

If an A.C. voltage is impressed to the terminals $A_1$ and $A_2$, it is rectified by the diode 4 and smoothed by the smoothing capacitor 8, and then a bias voltage devided by the bias resistors 6 and 7 is supplied to the base of the transistor 1 thereby making the transistor 1 conductive. The collector current rises according to the circuit time constant determined mainly by the effective inductance, capacitance and resistance of the primary winding 3 of the transformer. During this course of time, a positive feedback voltage is induced in a feedback winding 5, and hence the transistor 1 remains conductive.

If the collector current attains such a value that it is suppressed by the positive feedback voltage after its saturation, the transistor 1 is cut off rapidly by the action of reverse regeneration. At this time, a large inverse electromotive force appears in the primary winding 3 and hence the high voltage pulse takes place. This pulse voltage is stepped up with the secondary winding 10 and is rectified and smoothed by the diode 11 and the capacitor 12, respectively. Accordingly a D.C. high tension voltage is obtained. The voltage V of the output pulse in this circuit is given by $$V = L\, di/dt,$$

wherein t is time, i is a primary winding current and L is a composite inductance of the primary winding and the secondary winding of the transformer and is a fixed constant determined by the construction of the transformer. In the circuit, the cut-off time is determined by the circuit time constant and hence is a fixed constant. Therefore, neither L nor cut-off time shows large variations with temperature changes. However, since the primary windingf current i is determined by characteristics of the transistor and the source line voltage, then di/dt depends largely upon the temperature characteristics of the transistor and the source line voltage variation. Thus, in such an example prior art is defective in that the output voltage fluctuates largely depending upon the source line voltage variation and the ambient temperature, as shown by the curves of broken lines of FIG. 5. Hereupon, the parameter VB in FIG. 5 represents the input voltage.

SUMMARY OF THE INVENTION

The present invention relates to a high tension voltage source capable of reducing defects of the prior art by an extremely simple circuit. By constructing the circuit so as to make the transistor cut off when the primary winding current reaches a preset constant value, the output pulse voltage is almost constant and the power consumption is low.

DETAILED DESCRIPTION OF THE INVENTION

Figure 1:
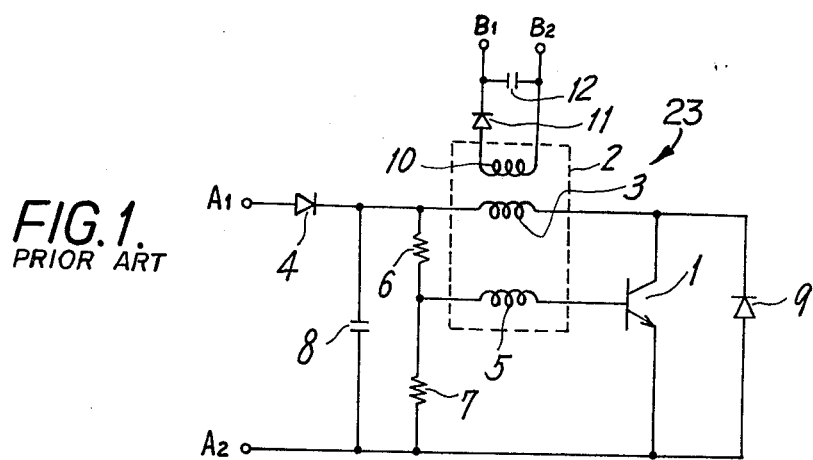
FIG. 1 is a circuit diagram of a high tension voltage source of prior art.
Figure 2:
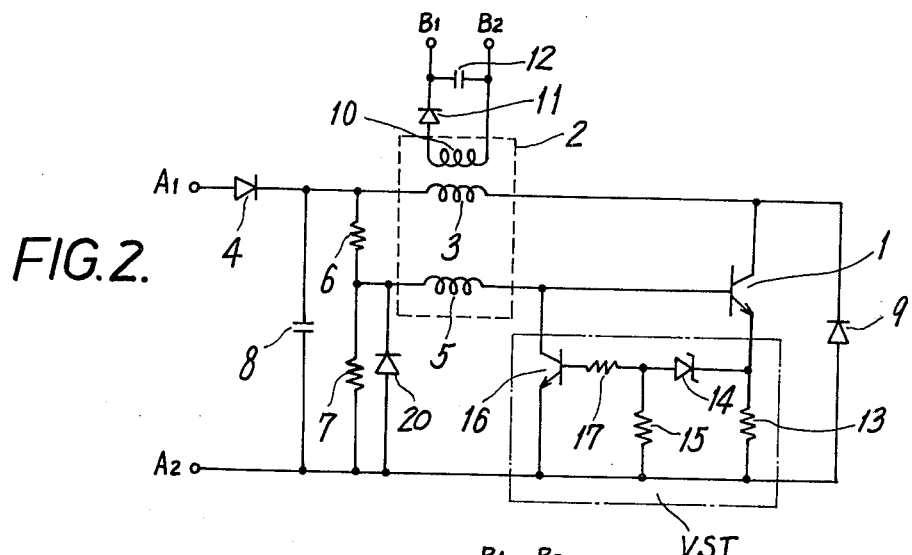
FIG. 2 is a circuit diagram of a first example of high tension voltage source of the present invention.

Referring first to Example 1 of the present invention as shown in FIG. 2, the entire circuit except the portion enclosed with a broken line and captioned VST, is the same as the prior art circuit 23 of FIG. 1, and the same numbers are given to the corresponding elements. A resistor 13 is connected between the emitter of a transistor 1 and a negative voltage terminal and across the resistor 13 a series connection of a constant-voltage element 14 having the voltage-responding negative resistance characteristics, such as a Zener diode, and the resistor 15 are connected. A transistor 16 is connected by its collector to the base of the transistor 1, by it emitter to the source negative terminal side of the resistor 13, and by its base to the connecting point of the abovementioned constant voltage element 14 and the resistor 15 through the resistor 17.

By constructing the circuit in the manner stated above, a current flowing through the transistor 1, that is a primary winding current, is limited as described below through the action of the Zener diode 14, and hence it is possible to cut off the transistor 1 always at a preset constant output winding current. Therefore, an output pulse voltage, V = L di/dt, where L is a composite inductance of a primary winding and a secondary winding of a step-up transformer, t is time and i is a primary winding current, becomes almost constant regardless of the variations in the characteristics of the transistor 1 and the source line voltage. That is, it becomes possible to obtain a high tension voltage source which is stable against the variations of the ambient temperature and the source line voltage. The abovementioned action of the circuit is explained below in further detail.

By impressing an A.C. voltage to terminals $A_1$ and $A_2$, it is rectified by a diode 4 and smoothed by a smoothing capacitor 8, and then a bias voltage divided by bias resistors 6 and 7 is supplied to the base of the transistor 1 thereby making the transistor 1 conductive and letting its collector current start to flow. The collector current rises according to the circuit time constant determined mainly by the effective inductance, capacitance and resistance of the primary winding 3 of the transformer 1. Consequently, a positive feedback voltage is induced in a feedback winding 5, and hence the transistor 1 is kept to be conductive. The collector current continues to rise and when a voltage across the resistor 13 reaches the breakdown voltage of the constant-voltage element, such as Zener diode 14, a current starts to flow in the resistor 15 and at the same time the base current starts to flow in the transistor 16 and then this transistor is turned to be conductive. Consequently the base current of the transistor 1 decreases rapidly and the current of the primary winding 3 is reduced. As the result of this, the feedback voltage decreases and owing to the reverse regeneration action the transistor 1 is cut off and then at this time, a large inverse electromotive force appears in the primary winding 3 and hence the high voltage pulse takes place. This pulse is stepped up with a secondary winding 10 and is rectified and smoothed by a diode 11 and a capacitor 12, respectively. Accordingly the D.C. high tension voltage is obtained. The voltage V of the output pulse obtained in this circuit is given by $$V = L \, di/dt,$$

wherein t is time, i is a primary winding current and L is a composite inductance of the primary winding and the secondary winding of the transformer and is a fixed constant determined by the construction of the transformer. In the circuit, the cut-off times is determined by the circuit time constant and hence is a fixed constant. Therefore, neither L not cut-off time shows large variations with temperature changes.

Figure 5:
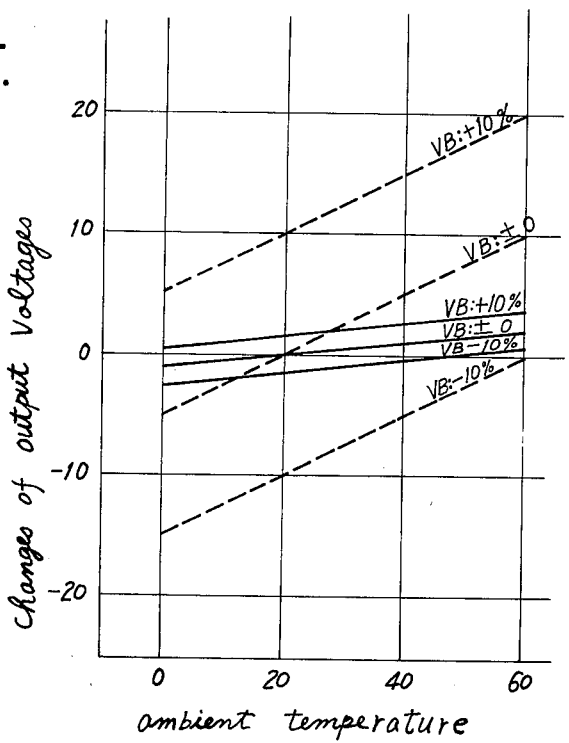
FIG. 5 is a graph showing relative changes (in %) of output voltage against change of the ambient temperature.

In the present invention, since the level of cut-off current of the transistor 1 is controlled by the emitter current of this transistor, which is almost the same effectively as the current of the primary winding current, the high tension output voltage is independent from the characteristics of the transistor 1 or the source. Therefore, the only factor which is influenced by the ambient temperature is the characteristics of the constant voltage element 14. But in general, a Zener diode has a good temperature characteristic, so that the stability of the output voltage against the ambient temperature variation is improved substantially. Furthermore, in the circuit of the present invention, since a constant current circuit which stabilizes the primary winding current is formed, the output voltage is stabilized also against the source line voltage variation. By selecting the circuit condition appropriately, such improved characteristic curves as shown by the solid lines of FIG. 5 were obtained. Hereupon, in this example the variation of the primary winding current is detected as the variation of the emitter current of the transistor 1, and consequently, in a strict sence the current of the primary winding itself can not be controlled. But in practice the difference between the primary winding current and the emitter current is very little so that for practical uses, a sufficient stabilization action is obtained.

Figure 3:
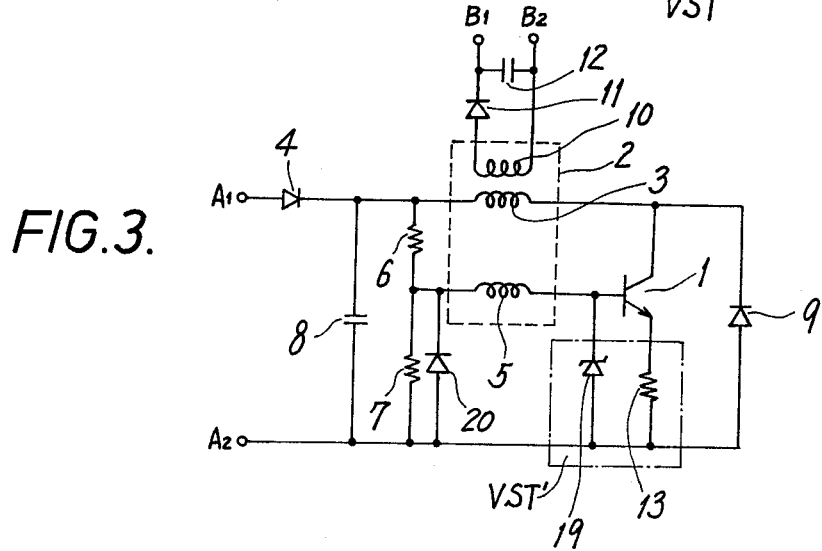
FIG. 3 is a circuit diagram of a second example of high tension voltage source of the present invention.

FIG. 3 shows Example 2 which is further simplified from Example 1 of FIG. 2.

In FIG. 3 the entire circuit except the portion enclosed with a broken line and captioned VST', is the same as the circuit of FIG. 2 except the portion labeled VST and the same members are given to the corresponding elements. Therefore the explanation of these common elements is omitted. In this circuit, between the base of the transistor 1 and the end of the resistor 13 connected to the negative voltage terminal, a constant-voltage element 19 having voltage-responding negative resistance characteristics, such as a Zener diode, is connectedas shown in the drawing. In this example, the current through the transistor 1 increases until the sum of the voltage across the resistor 13 and the base-emitter voltage drop of the transistor 1 equals the breakdown voltage of the zener diode 19 at which time the current is limited. As a consequence of this limitation the feedback voltage owing to the feedback winding 5 decreases, hence by the reverse regeneration action the transistor 1 is rapidly cut off and then the high voltage pulse takes place. In this case, in comparison with the example of FIG. 2, since the emitter-base voltage of the transistor 1 is a part of the cut-off condition, the influence of the ambient temperature appears to some degree. However, as compared with a breakdown voltage of the Zener diode of 4 to 10V, the emitter-base voltage is less than 1V, and therefore for practical purposes, unfavorable influences of the ambient temperature do not appear.

As shown by the abovementioned Examples 1 and 2, it is possible to simultaneously compensate variations both of the ambient temperature and of the source line voltage, through stabilizing the high voltage pulse by controlling the peak value of an oscillating current flowing in the primary winding, with a very simple circuit construction of adding a resistor and a constant-voltage element and without using any complicated stabilizing circuit. Because of the simplicity of the construction, a feature of high reliability is also obtainable. Furthermore, if adjustments of the high tension output voltage will be needed, the adjustments can be facilitated by replacing the resistor 13 with a variable resistor.

In the circuit of the prior art shown in FIG. 1, since the transistor 1 functions as a switching element of this circuit, it is desirable that the resistance of the transistor is as low as possible when it is in the conducting state. For this purpose, it is necessary to take the base current of the transistor 1 to be sufficiently large, and for this purpose it is required that the feedback voltage appearing in the feedback winding is made large and thereby the base current of the transistor 1 is made large. However, as is clear from the circuit construction, the power resulted from the feedback voltage is almost consumed by the bias resistor 7. On the other hand, the resistance value of the resistor 7 must be determined with the consideration of the resistance ratio with respect to the resistor 6, which is a part of the bias circuit of the transistor 1, and therefore it is not possible to reduce the resistance of the resistor 7 to a small value. Consequently it was inevitable that a large current flows in the resistor 7 of a considerably large resistance value. Because of this, the power consumption of the resistor 7 became large and it was the waste of power. Also, when parts with large power consumption were included, not only a large space for the thermal dissipation was needed, but also, because of the thermal effect from those parts, the consideration for the heat-resistance of neighboring parts was necessary.

Figure 4:
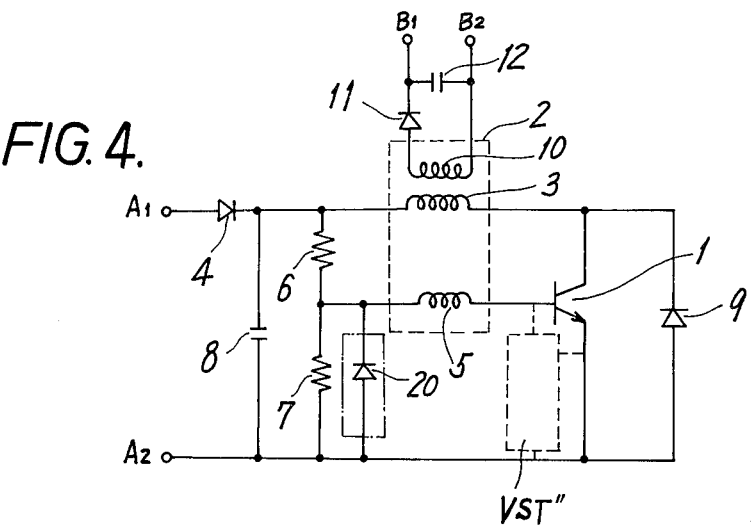
FIG. 4 is a circuit diagram of a third example of high tension voltage source of the present invention.

Example 3, as illustrated in FIG. 4 solves these problems mentioned in the prior art by providing an additional circuit means which reduces power consumption.

In FIG. 4, elements other than a diode 20 are the same to those of examples of FIGS. 2 or 3, and the same numbers are given to the corresponding elements and then the explanation of those elements is omitted. A blocked part VST" represents the block of VST or VST' of FIGS. 2 or 3, respectively. A diode 20 is connected in parallel with the resistor 7 of the voltage dividing circuit in the reverse polarity against the direction of the output voltage of the bias circuit. That is, the diode is connected with the polarity in a manner that the base current of the transistor 1 of the time period of positive feedback flows into the base of this transistor 1 through the diode 20 and the feedback winding 5.

With using the abovementioned circuit construction, even after the transistor 1 is activated by a voltage given from the connecting point between the resistors 6 and 7, the base current of the transistor 1 passes through the diode 20, and hence this current does not flow through the resistor 7. Therefore, the current flowing through the resistor 7 can be reduced sharply. Accordingly, the use of a small wattage type resistor can be used for the resistor 7. Also the power consumption due to the base current becomes small, because it is caused only by a forward current of the diode for which the resistance of the diode is small. Therefore, the reduction of whole size of the apparatus becomes possible, and hence any particular design for the heat-resistance of nearby parts becomes unnecessary.

Besides, even if some other active or passive elements exist somewhere in the base circuit of the transistor 1, that is, in the circuit of the base — the emitter — the diode 20 — feedback winding 5, the abovementioned purpose is also attainable. In brief, by adding the diode 20 in parallel with the resistor 7 as shown FIGS. 2 or 3, the abovementioned effect can be performed.

As has been described above, according to the present invention, a highly reliable high tension voltage source having an output voltage stabilization function can be made in low cost with a very simple construction, and it is also possible to add a circuit means for reducing power consumption. Thus the present invention is very useful when embodied in high tension voltage sources.

What is claimed

1. A high tension voltage source comprising:
a step-up transformer having a plurality of coupled windings including a primary power input winding adapted to be connected to a power source, a secondary winding, and a feedback winding;
an electronically controlled switch connected to said power input winding, said switch having a controlling terminal connected to said feedback winding for controlling the conduction of said switch;
control circuit means connected to said controlling terminal for limiting the peak current through said power input winding including an impedance element connected to said switch in a manner that said power input winding, said switch and said impedance element are connected in series across said power source and a zener diode connected to said impedance element to make said switch non-conductive when the voltage across said impedance element exceeds a predetermined value, causing said zener diode to become conductive;
a high tension rectifying element connected to said secondary winding; and
a diode connected to said feedback winding and said impedance element so that the current generated in said feedback winding flows in a circuit comprising said feedback winding said controlling terminal of said switch, a switching terminal of said switch, said impedance element and said diode.

2. A high tension voltage source of claim 1, wherein said switch is a transistor, having an emitter connected through said impedance element to one end of a power source, and said controlling terminal is the base of said transistor.

3. A high tension voltage source comprising:
a step-up transformer having a plurality of coupled windings including a primary power input winding adapted to be connected to a power source, a secondary winding, and a feedback winding;
an electronically controlled switch connected to said power input winding, said switch having a control terminal connected to said feedback winding for controlling the conduction of said switch;
control circuit means connected to said controlling terminal for limiting the peak current through said power input winding including an impedance element connected to said switch in a manner that said power input winding, said switch and said impedance element are connected in series across said power source and a zener diode, the cathode of said zener diode being connected to the junction of said switch and said impedance element and the anode of said zener diode being connected to the remainder of said control circuit means; and
a high tension rectifying element connected to said secondary winding.

4. A high tension voltage source of claim 3, wherein said switch is a transistor, having an emitter connected through said impedance element to one end of a power source, and said controlling terminal is the base of said transistor.

5. A high tension voltage source of claim 3 comprising a diode connected to said feedback winding and said impedance element so that the current generated in said feedback winding flows in a circuit comprising said feedback winding said controlling terminal of said switch, a switching terminal of said switch, said impedance element and said diode.

6. A high tension voltage source comprising:
a step-up transformer having a plurality of coupled windings including a primary power input winding adapted to be connected to a power source, a secondary winding, and a feedback winding;
an electronically controlled switch connected to said power input winding, said switch having a controlling terminal connected to said feedback winding for controlling the conduction of said switch;

control circuit means connected to said controlling terminal for limiting the peak current through said power input winding including an impedance element connected to said switch in a manner that said power input winding, said switch and said impedance element are connected in series across said power source and a zener diode, the cathode of said zener diode being connected to said controlling terminal and the anode of said zener diode being connected to the end of said impedance element not connected to said switch; and a high tension rectifying element connected to said secondary winding.

7. A high tension voltage source of claim 6, wherein said switch is a transistor, having an emitter connected through said impedance element to one end of a power source, and said controlling terminal is the base of said transistor.

8. A high tension voltge source of in claim 6 comprising a diode connected to said feedback winding and said impedance element so that the current generated in said feedback winding flows in a circuit comprising said feedback winding said controlling terminal of said switch, a switching terminal of said switch, said impedance element and said diode.

* * * * *